Sept. 6, 1927.  
W. A. BRUBAKER  
CUSHION TIRE  
Filed Jan. 30, 1924
1,641,150
2 Sheets-Sheet 1
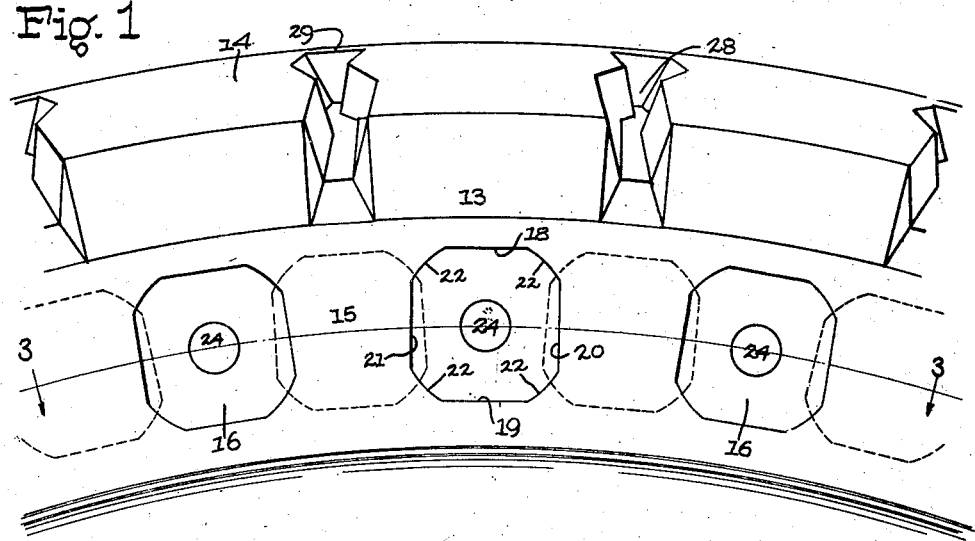
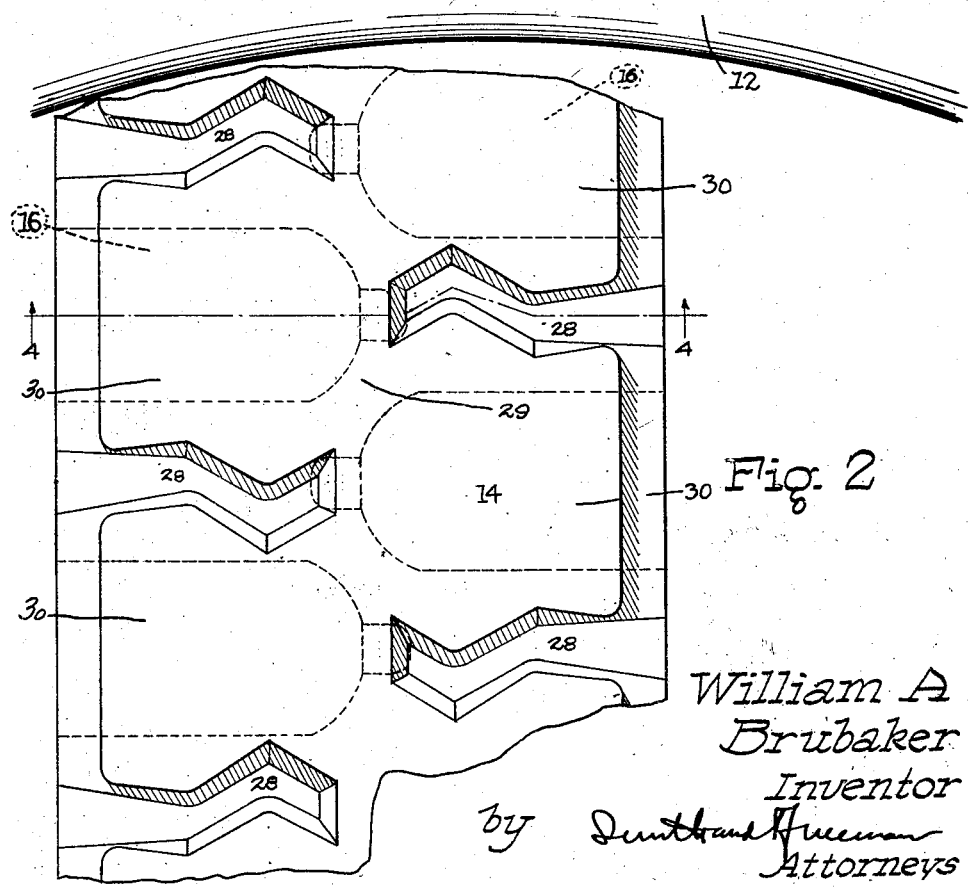
William A. Brubaker  
Inventor  
Attorneys Sept. 6, 1927.

W. A. BRUBAKER

CUSHION TIRE

Filed Jan. 30, 1924

William A. Brubaker
Inventor by
Attorneys

Patented Sept. 6, 1927.

1,641,150

UNITED STATES PATENT OFFICE.

WILLIAM A. BRUBAKER, OF AKRON, OHIO.

CUSHION TIRE.

Application filed January 30, 1924. Serial No. 689,402.

My invention relates to cushion tires and the principal object of my invention is to provide a cushion tire easy to manufacture, so formed as to minimize the likelihood of wave formation in the cushion portion, so formed as to constantly carry the load partly on air and partly on rubber, so formed as to yield readily under blows or impacts and thus simulate as readily as possible the resistance of a pneumatic tire, and so constructed that the resistance to yielding is substantially uniform about the periphery of the tire. In the drawings accompanying this specification and forming a part thereof I have shown, for purposes of illustration, one form which my invention may assume. In these drawings:

Figure 1 is a side elevation of this illustrative form of my invention,

Figure 2 is a rectified plan view of the tire shown in Figure 1 illustrating the relative relation of the various recesses, Figure 3 is a section on the line 3—3 of Figure 1, while

Figure 3:
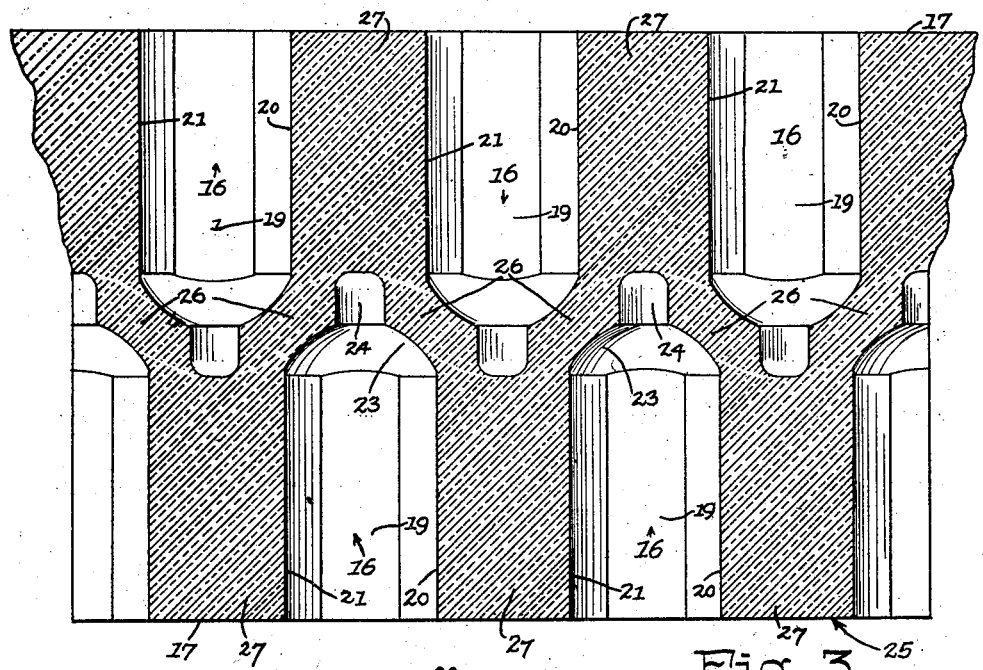
Figure 4:
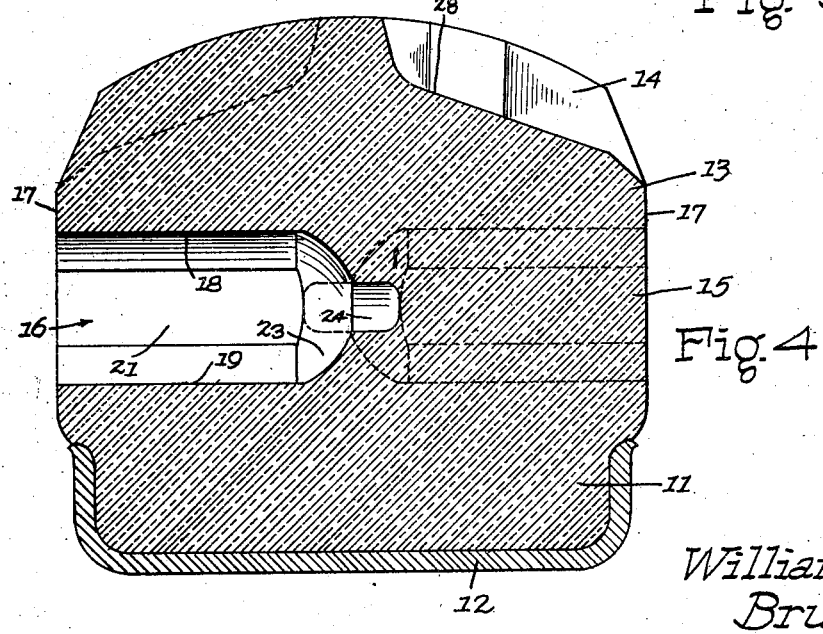
Figure 4 is a section on the line 4—4 of Figure 2.

The tire herein shown comprises a base region 11 fixed to a rim 12 of any suitable construction, a tread region 13 carrying a tread 14, and an intermediate region 15 disposed between the base region 11 and the tread region 13 effective to firmly connect the base region 11 and the tread region 13. The intermediate region 15 is so formed, and the intermediate region 15 and tread 14 are so correlated, that the tire not only absorbs readily the blows and impacts imposed upon it and thus prevents the transmission of these blows and impacts to the vehicle but also prevents the accumulation of wave action in the intermediate region 15 and the consequent destruction of the intermediate region 15 and at the same time presents at all points about the periphery a substantially uniform capacity for the absorption of blows and impacts and consequently eliminates the jar and vibration present in the tires now in use.

In the present embodiment of my invention I provide in the intermediate region 15 a plurality of recesses 16 arranged in two sets each extending inwardly from one of the two lateral faces 17 of the intermediate region 15 and in this particular embodiment of my invention the recesses 16 of each set are disposed in staggered relation to the recesses 16 of the other set and each recess 16 of either set is of a generally square cross section formed by the faces 18 and 19 generally parallel to the tangent to the tire at the point of intersection of the periphery of the tire and the radius extending centrally through the recess 16 and the faces 20 and 21 generally parallel to the axial plane through the center of the recess 16. In this embodiment, however, this square cross section is modified by the presence of the four inclined surfaces 22 extending between the ends of the main surface 18, 20, 19, and 21, while each of the recesses 16 is terminated by a substantially hemispherical surface 23 symmetrical with respect to the remainder of the recesses 16 but broken over the central portion by a cylindrical extension recess 24 of a diameter appreciably less than either the width or height of the abutment or fin 27 separating adjacent recesses 16 and of a length substantially equal to the shortest distance between a recess 16 on one side of the tire and the adjacent recess 16 on the opposite side of the tire. In addition, the recesses 16 are so placed that the abutments 27 between adjacent recesses 16 are of a width less than the width of the recesses 16.

The formation of these recesses 16 causes the intermediate region 15 to consist of a web 25 itself consisting of a peripherally extending sinuous rib 26 perforated by the extension recesses 24 and flanked on each side by a series of laterally extending fins 27 arranged in staggered relation and each of a width less than the height thereof and less than the circumferential extent of each recess 16.

In the present embodiment of my invention the recesses 28 in the tread 14 are formed substantially directly above the fins 27 between the recesses 16 whereby the tread consists of a narrow central rib 29 flanked on each side by a plurality of blocks 30 each overlying one of the recesses 16, of an extent peripherally of the tire greater than that of the recess 16, and, together with the rib 29, of an extent across the tire greater than that of the recess 16.

With the above construction the sinuosity of the web 26 and the spaced relation of the fins 27 prevent wave formation in the intermediate region 15, and the continuity of the ribs 26 and 30 causes the weight of the vehicle to be always carried partly on rubber, the dimensions and positioning of the various parts of the web 25 and the various parts of the tread 14 produce a tire which will yield readily, this same proportioning and positioning of the web 25 and correlation of the web 25 and tread 14 produces a tire in which the weight of the vehicle is at no point carried entirely by rubber, the construction of the web 25 and tread 14 and the correlation of the web 25 and tread 14 are such that at every point about the periphery of the tire the weight of the vehicle is carried partly by rubber under compression and partly by rubber which is without direct support and in tension, and the arrangement and dimensions of the parts of the web 25 and of the parts of the tread 14 and the correlation between the parts of the web 25 and the parts of the tread 14 are such that the resistance of the tire to compression is substantially the same at all points about the periphery of the tire.

It will be understood by those skilled in the art that the particular construction herein shown and described may be variously changed and modified without sacrificing the advantages of my invention or departing from the spirit thereof and it will therefore be understood that the disclosure herein is illustrative only and that my invention is not limited thereto.

I claim:

1. A cushion tire comprising an annular base region, an annular tread region, and an annular intermediate region disposed between said base region and said tread region and comprising a central peripherally extending rib and a plurality of fins extending laterally from each side of said rib in peripherally spaced relation with the fins on each side of said rib disposed opposite the spaces on the other side of said rib, with each of said fins of an extent peripherally of said tire not greater than the corresponding extent of the opposite space, and with said rib intercepted opposite each fin by a recess of an extent peripherally of said tire less than the corresponding extent of the opposite fin.

2. A cushion tire comprising an annular base region, an annular tread region, and an annular intermediate region disposed between said base region and said tread region and comprising a central peripherally extending sinuous rib and a plurality of fins extending laterally from each side of said rib in peripherally spaced relation with the fins on each side of said rib disposed opposite the spaces on the other side of said rib, with each of said fins of an extent peripherally of said tire not greater than the corresponding extent of the opposite space, and with said rib intercepted opposite each fin by a recess of a length substantially equal to the width of said rib and of an extent peripherally of said tire less than the corresponding extent of the opposite fin.

3. A cushion tire comprising an annular base region, an annular tread region, and an annular intermediate region disposed between said base region and said tread region and comprising a central peripherally extending rib and a plurality of fins extending laterally from each side of said rib in peripherally spaced relation with the fins on each side of said rib disposed opposite the spaces on the other side of said rib and with said rib intercepted opposite each fin by a recess extending inwardly from the communicating space and of an extent peripherally of said tire appreciably less than that of said communicating space.

In testimony whereof, I hereunto affix my signature.

WILLIAM A. BRUBAKER.